United States Patent [19]

Wilson

[11] 4,299,178
[45] Nov. 10, 1981

[54] FURNACE AND HEAT STORAGE ASSEMBLY

[76] Inventor: John W. Wilson, P.O. Box 291, Bozeman, Mont. 59715

[21] Appl. No.: 128,968

[22] Filed: Mar. 10, 1980

[51] Int. Cl.³ .............................................. F23B 7/00
[52] U.S. Cl. .................................. 110/234; 110/302; 110/303; 110/205; 126/400; 126/430; 126/436
[58] Field of Search ............... 110/302, 303, 323, 205, 110/234; 126/400, 430, 436

[56] References Cited

U.S. PATENT DOCUMENTS

| 655,221 | 8/1900 | Gallagher | 110/205 |
| 787,941 | 4/1905 | Phillippe et al. | 110/205 |
| 1,319,402 | 10/1919 | McGehee | 110/205 |
| 1,446,931 | 2/1923 | Rutherford | 110/205 |
| 2,284,506 | 5/1942 | Zuberbuhler | 110/303 |
| 3,295,591 | 1/1967 | Thomason | 126/400 X |
| 4,160,524 | 7/1979 | Stiber | 126/400 X |
| 4,248,204 | 2/1981 | Rowe | 126/400 X |

Primary Examiner—Edward G. Favors
Attorney, Agent, or Firm—Trask & Britt

[57] ABSTRACT

A furnace and associated heat storage assembly includes a firebox arranged within a rock storage area that incorporates a recirculating flue arrangement for returning unburned gases to below a fuel grate for mixing with fresh inlet air. The rock in the heat storage area is heated by conduction of heat from the firebox, circulating flue gases and a smoke exhaust flue. Inlet air is preheated. An open grate arrangement provides for efficient burning of solid as-producing fuel. A system for circulating air and/or liquid through the rock can be provided, as can a water storage tank.

12 Claims, 2 Drawing Figures

FURNACE AND HEAT STORAGE ASSEMBLY

BACKGROUND OF THE INVENTION

Field

The present invention relates to furnaces and associated heat storage arrangements.

State of the Art

Current energy resource needs and predicted future energy resource deficiencies can be met, on the one hand, by development of new systems and technology, and on the other by restructuring of old devices and technology to achieve additional efficiency.

Firebox arrangements for heating surrounding stones are well known in the art; one such arrangement common to the early Norsemen has evolved to the present-day sauna. Current technology for solar heating systems has adapted similar rock filled heat storage arrangements to present-day solar heating technology. Examples of such devices are shown in patents by Thomason, U.S. Pat. No. 3,236,294, and Keyes, U.S. Pat. No. 3,987,786. These devices include rock-filled vessels through which a solar heated media is moved to transfer heat into the surrounding rocks for later use.

Recirculation of unburned gases is not in and of itself new. Devices that provide for such recirculation are disclosed by patents to Cochran, U.S. Pat. No. 102,777; Jackson, U.S. Pat. No. 268,682; and Humphreys, U.S. Pat. No. 606,667.

There remains a need in the art for a combination and arrangement of a furnace and associated heat storage components which is energy efficient, well suited to today's needs and anticipatory of future shortages.

SUMMARY OF THE INVENTION

The present invention includes a firebox in which heat is produced by burning a combustible material. The heat is distributed into a surrounding solid heat-storing medium, such as crushed rock material. The rock medium serves as a heat reservoir, and provides for transfer of stored heat into a moving air mass. The present invention may include liquid transfer lines embedded in the rock medium to provide for heat transfer into the liquid. A notable application of this feature is for heating or preheating a residential hot water supply. An air inlet pipe is arranged to pass through the rock medium to preheat inlet air. This preheating increases the efficiency of the combustion process within the firebox.

The present invention also provides for recirculation of unburned gases through means structure dissimilar from those presently known to those skilled in the art. Such gases are injected below a flame source in the firebox for mixing with preheated inlet air. This premixing effects a nearly complete combustion of the recirculated gases. In this fashion, the energy of combustion of a material burned in the firebox is more completely utilized. Moreover, there remains little effluent of the pollutants normally generated by burning processes. Sensible heat is recaptured from the recirculating flue gases by the heat-storing medium, thereby further enhancing the efficiency of the system.

Another feature of the present invention is its grate system within the firebox. Wood, coal or other combustible material burned in the firebox creates cinders or ash. The grate system is arranged to freely pass such residue.

The furnace and heat storage assembly may be included as a portion of a solar heating system.

The entire system of this invention is simple and inexpensive to construct, requiring only conventional materials. It is easily assembled and installed in a building during its construction, or it can be conveniently installed in such a building after construction.

The present invention includes a firebox (preferably constructed of a heavy metal) located within a dwelling, or like structure to be heated. The firebox is closed except for an access door, and contains a grate system or like arrangement for supporting a supply of combustible material. The grate system is desirably of a self-cleaning type; that is, it should permit ash to pass through rather than accumulate. While the grate normally accommodates wood, coal or other solid fuel, it is within comtemplation that a conventional burner, such as one burning oil or natural gas, be installed in combination with or in place of the grate. Such a burner may be used to ignite solid fuel on the grate; or it may constitute a separate heat source. An exhaust flue connects into the firebox proximate, but below, its top. This flue is dog-legged appropriately across the firebox top to intersect a conventional chimney arrangement, thereby to provide a large area of metal which is heated by the exhaust gases. The firebox and flue are preferably arranged within an insulated wall structure, and the space between the walls and the other components is packed with a heat absorbant medium, such as crushed rock, with a low coefficient of thermal expansion. With the components of the system so arranged, heat is conducted from the firebox and exhaust flue into the heat-absorbant medium, which in turn serves as a reservoir for storing heat. A source of fresh air is provided into the firebox below the grate for supporting combustion on the grate. The fresh air is preferably conducted through a pipe arranged in heat transfer relationship with the rock medium.

Flues are also arranged within the firebox for the recirculation of unburned gases. These flues preferably comprise tubes with an inlet end that intersects the firebox top, above the level of the exhaust flue, bent around the firebox side with a discharge portion arranged across the firebox interior, below the grate system. The unburned gas recirculating flues receive hot unburned gases from the top of the firebox interior. As those gases cool, they descend through the flues, finally exiting the flues through openings in their discharge portions. They are then mixed with fresh air from the fresh air inlet for reburning with fuel on the grate. The heat generated by the furnace is thus increased, while the effluent of pollutants generated by burning processes within the furnace is substantially decreased.

Additionally, water transfer lines and a water storage tank can be arranged within the rock medium as a primary or secondary culinary water heating source. These lines may include fins, or the like, for improving the efficiency of heat transfer from the rock medium. Ducting may be included to transfer heat to or from other regions of a structure. Depending upon the design requirements of the total system, heat may be transferred directly to the rock medium or to either air or liquid transporting lines in the rock medium. For example, heat from a solar heating unit may be transferred into the rock medium for storage in this fashion.

The present invention thus provides for efficient energy utilization from the burning of a combustible material. It is also capable of storing heat generated by such burning, or from other sources, such as a solar heating arrangement. The heat storage assembly is simple to construct and install within a structure, and is adaptable to heat that structure, to heat water for use in that structure and/or to store heat for later use. It involves a minimum of working parts, thereby assuring a long useful life.

BRIEF DESCRIPTION OF THE DRAWINGS

In the drawings, which illustrate that which is presently regarded as the best mode for carrying out the invention.

DETAILED DESCRIPTION OF THE ILLUSTRATED EMBODIMENT

Figure 1:
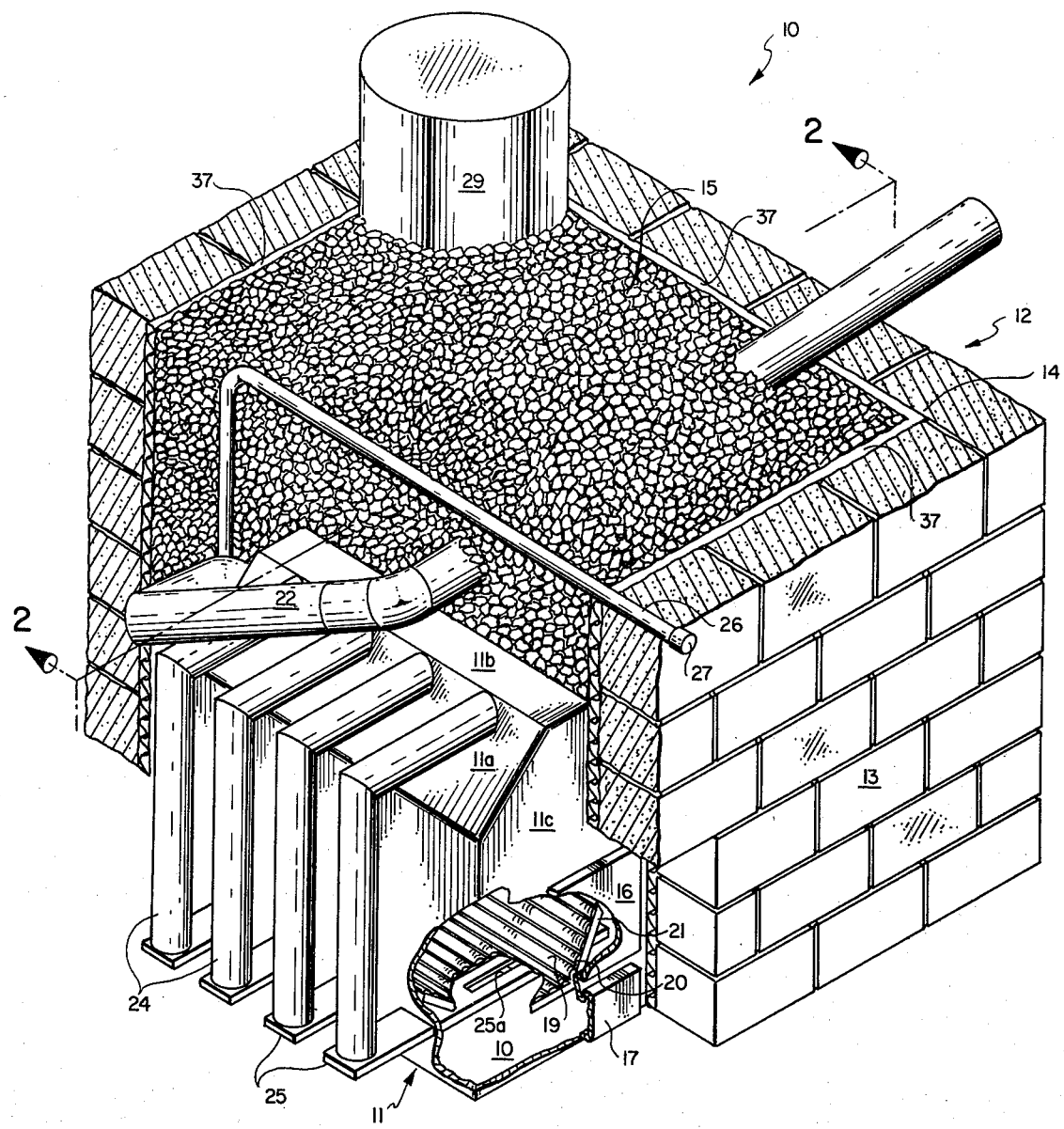
FIG. 1 is a perspective view with portions shown removed of a furnace and heat storage assembly of the present invention.
Figure 2:
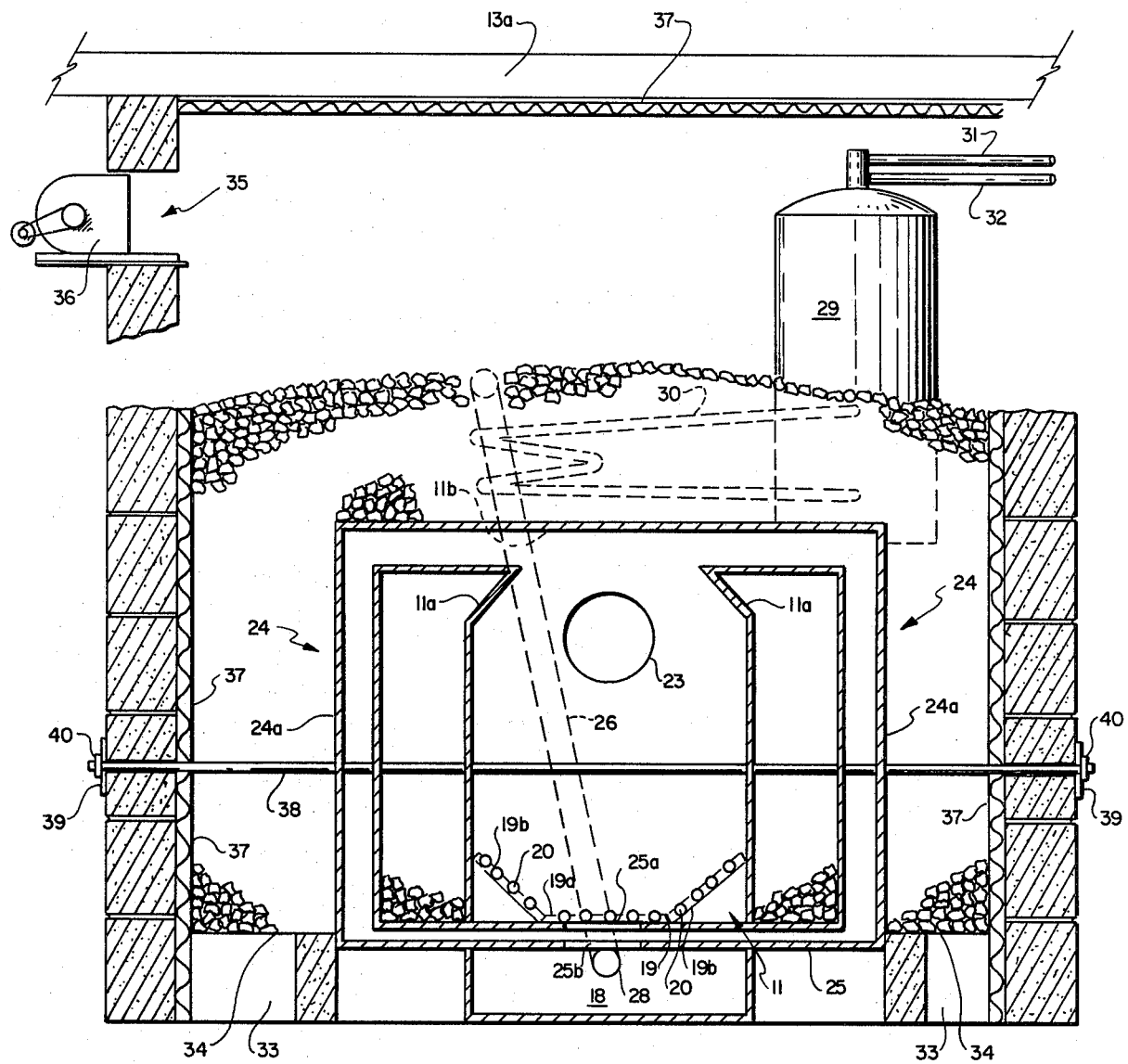
FIG. 2 is a sectional view taken along the reference line 2—2 of FIG. 1, adding a portion of the wall shown removed from FIG. 1, and showing certain optional components in broken lines.

FIG. 1 shows a preferred arrangement of the present invention in a furnace and heat storage assembly 10 that consists of a firebox 11 that is enclosed by a wall 13, partially broken away to expose firebox 11. Firebox 11, in turn, is shown with a frontal section removed to expose its interior. In addition to wall 13, as shown in FIGS. 1 and 2, the heat storage assembly preferably includes a roof 13a and an inner liner (preferably of an insulating material) 14 for separating the wall and roof from a rock medium 15, or like heat-retaining material, hereinafter referred to as "rock." The rock will desirably have a low coefficient of thermal expansion. Granite gravels are suitable, for example. Heat transferred from the firebox 11 and an associated exhaust flue 22 is conducted into the rock 15 for storage and withdrawal.

As best shown in FIG. 1, firebox 11 is preferably rectangular-shaped, and is closed off across the sides and bottom, with a top formed from plates 11a that slope towards one another meeting in a top plate 11b that is approximately parallel the bottom. Firebox 11 has a front face 11c with openings that are normally closed off by a hinged grate door 16 and ash door 17.

Ash door 17 provides access into an ash pit 18 area of firebox 11 as shown best in FIG. 2. Grate door 16 provides access to a grate 19 within the firebox. While not shown, it should be understood that firebox 11 could also contain a gas or heating oil burner appropriately located with respect to grate 19 to provide either a convenient arrangement for igniting materials on grate 19 or a primary heat source. Embodiments are also within contemplation which provide an arrangement for automatically feeding combustible materials into firebox 11.

Grate 19 is preferably made up of a flat-bottom section 19a with upwardly sloping sides or wings 19b secured along their opposite sides. Grate 19 is preferably formed from sections 20 or lengths of solid metal materials such as conventional bar stock of any appropriate shape. Grate sections 20 are mounted to grate ends 21, (preferably of metal bar sotck), e.g., by welding, spaced apart to encourage a free flow of ash between them into the ash box 18 below. A tray, (not shown), may be arranged in the ash box 18 to receive ashes for subsequent removal through the ash door 17.

Firebox 11 incorporates an exhaust flue 22 that has an inlet end 23, as shown best in FIG. 2, spaced downwardly apart fom firebox top plate 11b (shown in broken lines). As a combustible material is burned on grate 19, the combustion process generates hot gases. These gases rise within the firebox, the lighter unburned combustible gases coming to rest against the firebox top plate 11b, while the heavier fraction migrates into the exhaust flue inlet 23 of exhaust flue 22, ultimately being passed to a conventional chimney (not shown). The unburned combustible gases that rise to the top of the firebox constitute both an energy source and a source of pollution. Therefore, it is desirable to reburn these gases. To provide for such reburning, the present invention includes recirculating flues 24 which are illustrated as U-shaped, open along the firebox top and extending beyond and approximately parallel the firebox walls, connecting at their other ends to heavy rectangular tubes 25 that extend across the firebox base bottom, below the grate 19. The hot unburned gases thus flow into the circulating flues, cool and descend through vertical tubing sections 24a. The weight of the descending gas forces the cooled gases below into rectangular tube 25. Rectangular tube 25 includes aligned slots 25a and 25b below grate 19 and above a fresh air pipe 28. The unburned gases thus mix with the fresh air supply and pass into a fire of burning materials on grate 19. Preferably, slot 25b is made larger than slot 25a to pass any ash that falls through slot 25a.

Fresh air is provided to air pipe 28 through a fresh air supply tube 26 that is shown in solid lines in FIG. 1 and in broken lines in FIG. 2. The fresh air supply line 26 receives air from an open inlet end 27 that may be adapted to a screen or control valve arrangement (not shown) for controlling air flow. Fresh air supply line 26 is arranged to pass through rock materials 15 across the top plate 11b of firebox 11 and down to connect to fresh air pipe 28. Appropriate openings are formed in fresh air pipe 28 to permit air to pass through the respective openings 25a and 25b, thereby mixing with the unburned gases flowing through grate 19. Arranging the air supply line 26 through the rock 15 provides for preheating the fresh air, thereby increasing the efficiency of the burning processes on grate 19. Although the particular configuration of air supply line 26, as shown in FIGS. 1 and 2, is preferred, other configurations are within contemplation.

Optionally, a hot water heating arrangement can be incorporated with the furnace and heat storage assembly of the present invention. The arrangement shown includes a tank 29 and water circulating lines 30 (shown in broken lines in FIG. 2) that are arranged within the rock 15 to receive transferred heat. Hot water exit line 31 and safety "pop off" exit line 32, respectively, connect into the top of tank 29. Cold water supplied to the bottom of tank 29 passes to line 30 for heating. Hot water stored in tank 29 is passed through hot water line 31 for use. Tank 29 and the associated lines will ordinarily constitute a hot water preheating system for use in conjunction with a conventional home water heater. However, this arrangement may be adapted to constitute the sole source of hot water for a structure.

The firebox 11, exhaust flue 22 and gas recirculating flues 24 transfer heat into the surrounding rock 15. Rock 15 thereby provides a heat source or heat reservoir for use in fresh air preheating and hot water heating. Additionally, this heated rock provides a heat source for a conventional forced air heating system (one such arrangement being shown in FIG. 2). With appropriate water-carrying lines arranged through the rock, the present invention can supply heated water for radiator-type heating systems. As shown in FIG. 2, air vents 33 are arranged through wall 13, proximate the bottom of the heat storage assembly to permit free passage of air. A screen 34, or the like, may be arranged across the top as shown. Preferably, an opening 35 is provided near the top of wall 13 for drawing or pushing heated air off of the rock 15 in the heat assembly 12 for movement through appropriate ducts (not shown) throughout a structure. In the arrangement of FIG. 2, air is pulled by fan 36 up through the rock 15, absorbing heat in that passage, and is then circulated by appropriate ducting throughout the structure.

Walls 13 and ceiling 13a are preferably internally lined with insulation 37 to provide a barrier against heat loss and to accommodate expansion of the rock medium 15. Further, walls 13 are preferably strengthened to resist outward expansion or flow of the rock 15 by a tie bolt 38 arranged across the heat storage assembly 12 and through walls 13, with appropriate collars 39 fitted over the ends thereof and held in place, as with nuts 40.

While a preferred embodiment of the present invention has been shown and described herein, it should be understood that the present disclosure is made by way of example only, and that variations are possible without departing from the subject matter coming within the scope of the following claims, which themselves recite those details regarded as essential to the invention.

I claim:

1. A furnace and heat storage assembly comprising:
   a firebox with a bottom to support burning of a combustible material therein, and having a top plate to collect unburned combustible gases found in a lighter gas fraction zone above a heavier burned gas fraction zone;
   an unburned gas recirculating flue with an open inlet end in communication with the lighter gas fraction zone, and an open exhaust end in communication with the firebox bottom;
   fresh air supply means for injecting a supply of fresh air into said firebox to support combustion therein;
   means for preheating an air flow through said fresh air supply means prior to its passage into said firebox; and
   an exhaust flue for removing the heavier gas fraction from the interior of the firebox having: an open inlet end in communication with the interior of the firebox mounted above the combustible material proximate the heavier burned gas fraction zone, and an exhaust end in communication with the ambient environment.

2. A furnace and heat storage assembly according to claim 1, further including:
   a grate mounted in the firebox to support burning of a combustible material formed to provide open areas therethrough to freely pass ash, which grate has a flat center section with wings secured along opposite sides thereof that extend upwardly at obtuse angles from the plane of said center section.

3. A furnace and heat storage assembly according to claim 1, including means for maintaining a heat absorbing material proximate said firebox to absorb heat therefrom.

4. A furnace and heat storage assembly according to claim 3, wherein rock is arranged within said means for maintaining a heat absorbing material to absorb heat transferred from the unburned gas recirculating flue and the exhaust flue.

5. A furnace and heat storage assembly according to claim 4, wherein the means for preheating the air flow consists of a fresh air supply means in heat transfer relationship with the rock.

6. A furnace and heat storage assembly according to claim 5, wherein themeans for maintaining a heat absorbing material comprise:
   block walls which surround all but an accessible face of the firebox;
   the fresh air supply means is a pipe that extends from an air flow control arranged at said accessible face of the firebox, over said firebox, and lengthwise into said firebox; and
   the portion of said pipe within said firebox has a plurality of openings therein.

7. A furnace and heat storage assembly according to claim 1, wherein the unburned gas recirculating flue consists of open tubular members that intersect the opposite sides of the firebox, proximate the top thereof, connect into a discharge tube that passes across said firebox, below the combustion zone of the furnace, which discharge tube has openings formed therein for passing unburned gas into admixture with fresh air.

8. A furnace and heat storage assembly according to claim 3, further including means for circulating an air flow through the heat absorbing material to retrieve heat therefrom.

9. A furnace and heat storage assembly according to claim 8, wherein the means for circulating an air flow consists of,
   a vent opening formed in the means for maintaining a heat absorbing material;
   a second opening formed in said means for maintaining a heat absorbing material; and
   fan means arranged in said second opening to draw an air flow from said vent opening through the heat absorbing material.

10. A furnace and heat storage assembly according to claim 3, further including means for transferring heat from the heat absorbing material into a water circulation system.

11. A furnace and heat storage assembly according to claim 10, wherein the means for transferring heat from the heat absorbing material into a water circulation system consists of,
    a water transport pipe embedded in said heat absorbing material;
    a tank connected to said water transport pipe to receive heated water therefrom;
    a cold water feed pipe connecting to said water transport pipe to pass water to be heated thereto; and
    a hot water line connected to said tank to receive heated water therefrom.

12. A furnace and heat storage assembly as recited in claim 11, wherein the tank is embedded in the heat absorbing material.

* * * * *